United States Patent
Agrawal et al.

(10) Patent No.: US 11,645,294 B2
(45) Date of Patent: *May 9, 2023

(54) INTERACTIVE IDENTIFICATION OF SIMILAR SQL QUERIES

(71) Applicant: Cloudera, Inc., Palo Alto, CA (US)

(72) Inventors: Rituparna Agrawal, Palo Alto, CA (US); Anupam Singh, Palo Alto, CA (US); Prithviraj Pandian, Palo Alto, CA (US)

(73) Assignee: Cloudera, Inc., Santa Clara, CA (US)

( * ) Notice: Subject to any disclaimer, the term of this patent is extended or adjusted under 35 U.S.C. 154(b) by 533 days.

This patent is subject to a terminal disclaimer.

(21) Appl. No.: 16/826,113

(22) Filed: Mar. 20, 2020

(65) Prior Publication Data

US 2020/0250179 A1 Aug. 6, 2020

Related U.S. Application Data

(63) Continuation of application No. 15/495,397, filed on Apr. 24, 2017, now Pat. No. 10,599,664.

(60) Provisional application No. 62/326,595, filed on Apr. 22, 2016.

(51) Int. Cl.
| | |
|---|---|
| G06F 16/248 | (2019.01) |
| G06F 16/84 | (2019.01) |
| G06F 16/21 | (2019.01) |
| G06F 16/28 | (2019.01) |
| G06F 16/2455 | (2019.01) |

(52) U.S. Cl.
CPC .......... *G06F 16/248* (2019.01); *G06F 16/211* (2019.01); *G06F 16/2455* (2019.01); *G06F 16/285* (2019.01); *G06F 16/86* (2019.01)

(58) Field of Classification Search
None
See application file for complete search history.

(56) References Cited

U.S. PATENT DOCUMENTS

| | | | |
|---|---|---|---|
| 7,050,992 B1 | 5/2006 | Bowman et al. | |
| 9,530,081 B2 | 12/2016 | Kami | |
| 2005/0050033 A1* | 3/2005 | Thomas | ............ G06F 16/24553 |
| 2005/0065969 A1* | 3/2005 | Thomas | ................ G16B 50/20 |
| | | | 707/999.102 |

(Continued)

*Primary Examiner* — Ashish Thomas
*Assistant Examiner* — Mellissa M. Ohba
(74) *Attorney, Agent, or Firm* — Perkins Coie LLP

(57) ABSTRACT

Systems and methods for very fast grouping of "similar" SQL queries according to user-supplied similarity criteria. The user-supplied similarity criteria include a threshold quantifying the degree of similarity between SQL queries and common artifacts included in the queries. A similarity-characterizing data structure allows for the very fast grouping of "similar" SQL queries. Because the computation is distributed among multiple compute nodes, a small cluster of compute nodes takes a short time to compute the similarity-characterizing data on a workload of tens of millions of queries. The user can supply the similarity criteria through a UI or a command line tool. Furthermore, the user can adjust the degree of similarity by supplying new similarity criteria. Accordingly, the system can display in real time or near real time, updated SQL groupings corresponding to the newly supplied similarity criteria using the originally computed similarity-characterizing data structure.

20 Claims, 16 Drawing Sheets

(56) References Cited

U.S. PATENT DOCUMENTS

| | | |
|---|---|---|
| 2010/0125559 A1 | 5/2010 | Hadjieleftheriou et al. |
| 2013/0086098 A1* | 4/2013 | Lewak ................ G06F 16/9032 |
| | | 707/759 |
| 2014/0324870 A1 | 10/2014 | Kami |
| 2018/0157703 A1 | 6/2018 | Wang et al. |

* cited by examiner

Query 1:

```
SELECT  item.i_item_id,
        Avg(store_sales.ss_net_paid),
        Avg(store_sales.ss_quantity),
        Avg(store_sales.ss_list_price),
        Avg(store_sales.ss_coupon_amt),
        Avg(store_sales.ss_sales_price),
        Avg(store_sales.ss_net_profit)
FROM    store_sales,
        customer_demographics,
        date_dim,
        item
WHERE   store_sales.ss_sold_date_sk = date_dim.d_date_sk
        AND store_sales.ss_item_sk = item.i_item_sk
        AND store_sales.ss_cdemo_sk = customer_demographics.cd_demo_sk
        AND customer_demographics.cd_gender = 'M'
        AND customer_demographics.cd_marital_status = 'M'
        AND customer_demographics.cd_education_status = '4 yr Degree'
        AND customer_demographics.cd_credit_rating = 'Good'
        AND item.i_current_price > 10
        AND date_dim.d_year = 2017
GROUP   BY item.i_item_id
ORDER   BY item.i_item_id;
```

Query 2:

```
SELECT  item.i_item_id,
        Avg(store_sales.ss_net_paid),
        Avg(store_sales.ss_quantity),
        Avg(store_sales.ss_list_price),
        Avg(store_sales.ss_coupon_amt),
        Avg(store_sales.ss_sales_price),
        Avg(store_sales.ss_net_profit)
FROM    store_sales,
        customer_demographics,
        date_dim,
        item
WHERE   store_sales.ss_sold_date_sk = date_dim.d_date_sk
        AND store_sales.ss_item_sk = item.i_item_sk
        AND store_sales.ss_cdemo_sk = customer_demographics.cd_demo_sk
        AND customer_demographics.cd_gender = 'M'
        AND customer_demographics.cd_marital_status = 'M'
        AND item.i_category IN ('Men', 'Sports', 'Music')
        AND date_dim.d_year = 2017
GROUP   BY item.i_item_id
ORDER   BY item.i_item_id;
```

*FIG. 5A*

Query 3:
```
SELECT  item.i_item_id,
        Avg(store_sales.ss_quantity),
        Avg(store_sales.ss_coupon_amt),
        Avg(store_sales.ss_sales_price)
FROM    store_sales,
        customer_demographics,
        date_dim,
        item
WHERE   store_sales.ss_sold_date_sk = date_dim.d_date_sk
        AND store_sales.ss_item_sk = item.i_item_sk
        AND store_sales.ss_cdemo_sk = customer_demographics.cd_demo_sk
        AND customer_demographics.cd_gender = 'F'
        AND customer_demographics.cd_marital_status = 'M'
        AND item.i_category IN ('Jewelry', 'Women', 'Shoes')
        AND date_dim.d_year = 2015
GROUP   BY item.i_item_id
ORDER   BY item.i_item_id;
```

Query 4:
```
SELECT  item.i_item_id,
        Avg(store_sales.ss_quantity),
        Avg(store_sales.ss_list_price),
        Avg(store_sales.ss_coupon_amt),
        Avg(store_sales.ss_sales_price)
FROM    store_sales,
        customer_demographics,
        date_dim,
        item
WHERE   store_sales.ss_sold_date_sk = date_dim.d_date_sk
        AND store_sales.ss_item_sk = item.i_item_sk
        AND store_sales.ss_cdemo_sk = customer_demographics.cd_demo_sk
        AND customer_demographics.cd_gender = 'F'
        AND customer_demographics.cd_marital_status = 'D'
        AND customer_demographics.cd_education_status = 'Advanced Degree'
        AND customer_demographics.cd_credit_rating = 700
        AND date_dim.d_year = 2018
GROUP   BY item.i_item_id
ORDER   BY item.i_item_id;
```

*FIG. 5B*

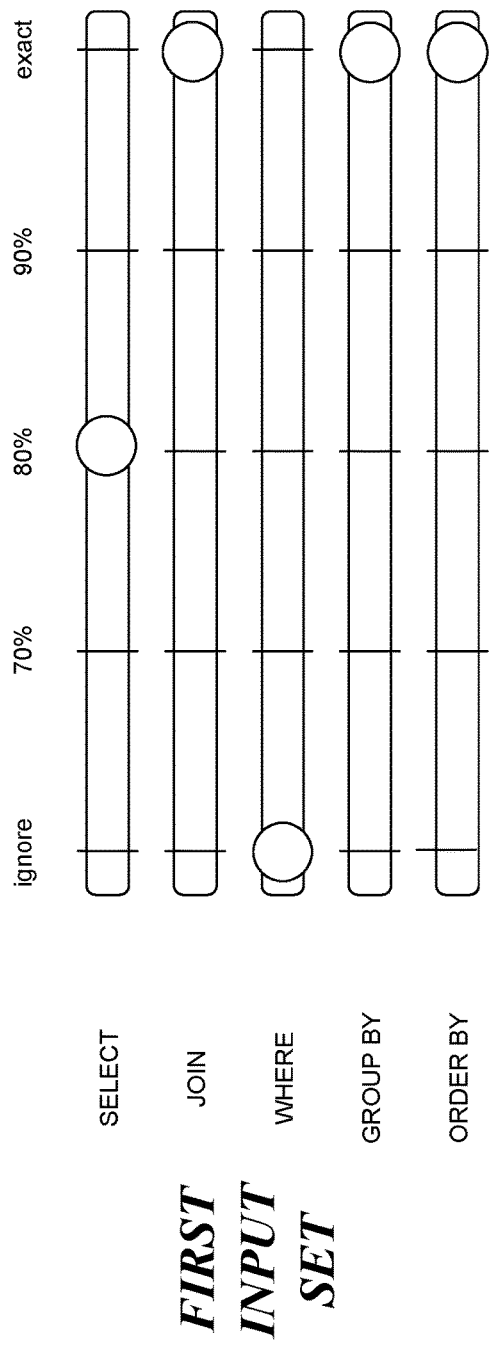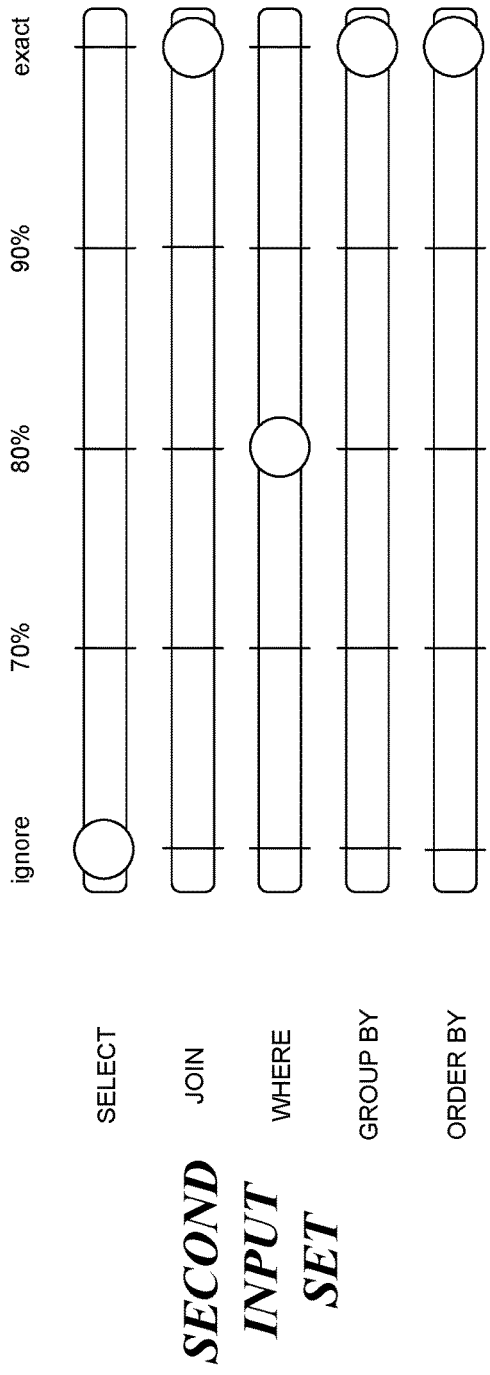
FIG. 6A-1
FIG. 6A-2

FIRST RESULT SET
*FIG. 6B-1*

FIRST RESULT SET
*FIG. 6B-2*

SECOND RESULT SET

SECOND RESULT SET

Similarity Matrix for SELECT artifact

|    | q1  | q2  | q3  | q4  |
|----|-----|-----|-----|-----|
| q1 |     | 1   | 1   | 5/7 |
| q2 |     | 1   | 1   | 5/7 |
| q3 |     | 4/7 | 4/7 | 4/5 |
| q4 |     | 5/7 | 5/7 | 1   |

*FIG. 6D-1*

Similarity Matrix for FILTER artifact

|    | q1  | q2  | q3  | q4  |
|----|-----|-----|-----|-----|
| q1 |     | 1   | 3/6 | 5/6 |
| q2 |     | 3/6 | 1   | 3/6 |
| q3 |     | 3/6 | 1   | 3/6 |
| q4 |     | 5/6 | 3/6 | 1   |

*FIG. 6D-2*

INTERACTIVE IDENTIFICATION OF SIMILAR SQL QUERIES

CROSS-REFERENCE TO RELATED APPLICATION(S)

This application is a continuation of U.S. patent application Ser. No. 15/495,397, filed Apr. 24, 2017, entitled "INTERACTIVE IDENTIFICATION OF SIMILAR SQL QUERIES, and claims the benefit of U.S. Provisional Application No. 62,326,595, filed Apr. 22, 2016, entitled "INTERACTIVE CLASSIFICATION OF SQL QUERIES INTO EQUIVALENCE CLASSES," both of which are incorporated by reference herein in their entireties.

TECHNICAL FIELD

The present application relates to enhancing scalability, performance, and efficiency in databases. More particularly, the present application relates to techniques for identifying similar queries stored in a database storing a large amount (e.g., hundreds to millions) of queries.

BACKGROUND

RDBMSs (Relational Database Management Systems) form a critical part of the infrastructure of business enterprises today. From day-to-day operations to analytic forecasting of the business, RDBMSs are at the heart of most of today's enterprises. An important feature of RDBMSs is that a single database can be spread across multiple tables that are related to one another. This differs from flat-file databases, in which each database is self-contained in a single table. In RDBMSs, relationships between tables can be specified at the time of creating the tables.

SQL is the primary interface to RDBMSs, and SQL queries that are logged by these databases provide a wealth of information about data access patterns in the organization. The insights gleaned from analyses of these database logs can be important. For example, the marketing department in an organization might be interested in data related to usage of a product and querying questions to product usage data stored in a database. The engineering department in the organization can also be making similar queries to the database. In such a situation, it might be possible to generate a pre-made report identifying usage patterns that can be distributed to both departments, thereby saving valuable computation time in the database. Understanding patterns in SQL queries can also aid in developing database optimization techniques such as indexes or materialized views, specific to a set of SQL queries.

For these and several other reasons, identifying similar SQL queries from SQL logs can be of great interest to database architects. However, analyzing SQL logs can pose several challenges. For example, the number of queries executed by a modern enterprise database can easily run into the tens of millions or more. When faced with such a huge amount of SQL queries, it can be very difficult for a database architect to get answers to questions such as: "how many queries are exact duplicates of each other?", "are all these queries unique?", or "how many queries are similar, even though they might not be exact duplicates?".

BRIEF DESCRIPTION OF THE DRAWINGS

FIGS. 5A and 5B are examples of database queries, according to one embodiment of the present disclosure;

FIGS. 6A-1 and 6A-2 (collectively referred to herein as FIG. 6A) are examples of a first input set and a second input set, respectively, according to one embodiment of the present disclosure;

FIGS. 6B-1 and 6B-2 (collectively referred to herein as FIG. 6B) are examples of a first result set showing a grouping of similar SQL queries, according to one embodiment of the present disclosure;

FIGS. 6C-1 and 6C-2 (collectively referred to herein as FIG. 6C) are examples of a second result set showing a grouping of similar SQL queries, according to one embodiment of the present disclosure;

FIGS. 6D-1 and 6D-2 (collectively referred to herein as FIG. 6D) show examples of similarity matrices, according to one embodiment of the present disclosure;

DETAILED DESCRIPTION

Figure 1:
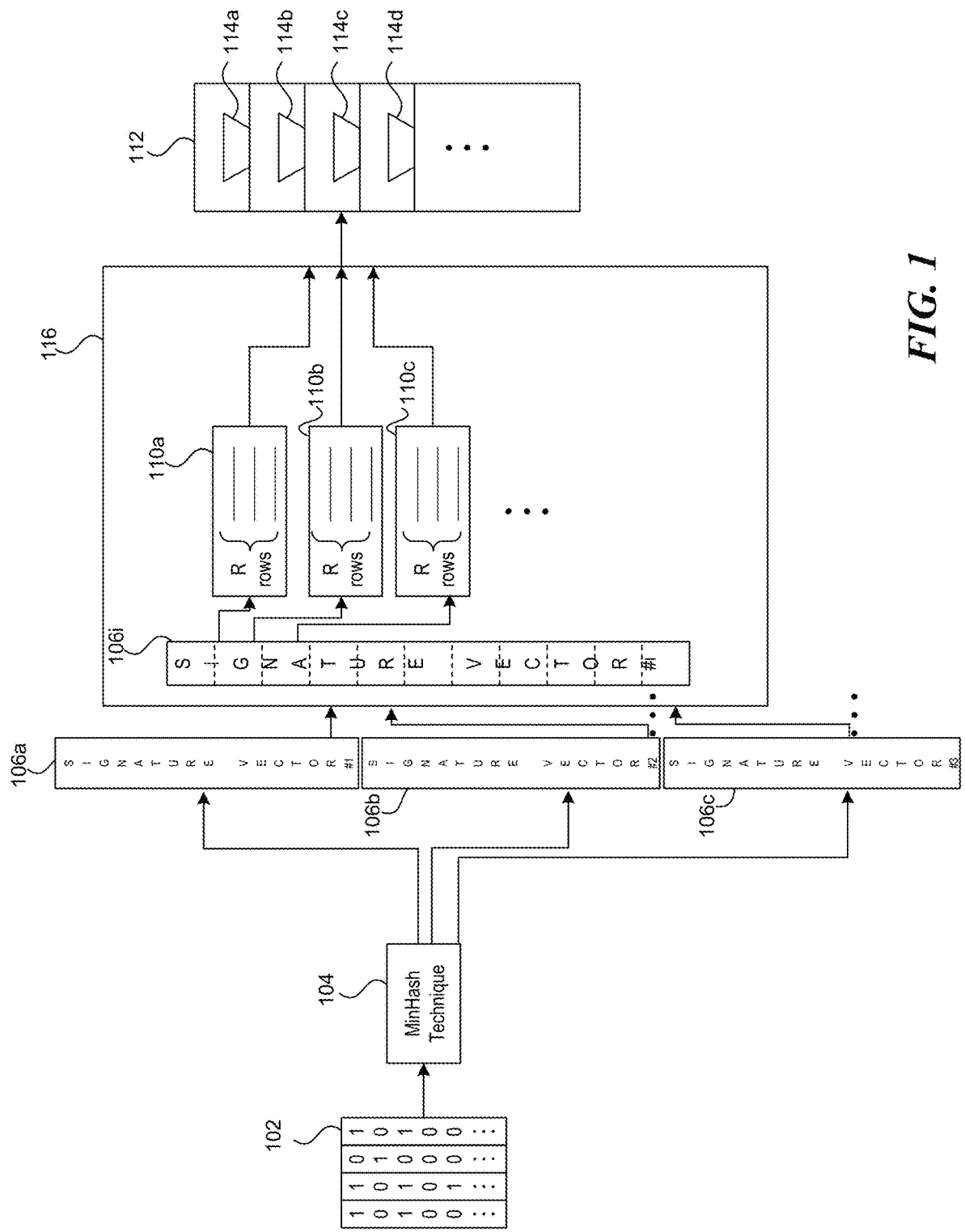
FIG. 1 is an illustration of identifying similar SQL queries, according to one embodiment of the present disclosure.

Embodiments of the present disclosure are directed at systems and methods of identifying similar database queries. The similarity of database queries is based on user-supplied similarity criteria. For example, the user-supplied similarity criteria can include an artifact (e.g., a clause such as SELECT) that is of interest to the user and a similarity threshold associated with the artifact. Thus, e.g., a user may be interested in identifying database queries that include the SELECT clause with a 30% similarity threshold, i.e., the user is interested in identifying queries in which at least 30% of the SELECT columns are the same.

An illustrative example highlighting comparison of a pair of simple SQL queries is considered. In this example, the SQL queries involved are a SELECT clause and a FROM clause. A database architect can consider various criteria for identifying two queries as being similar. Non-limiting examples of similarity criteria can be:

Criteria #1: Ignore the SELECT clause. Match queries based only on the tables in the FROM clause Criteria #2: Look at both SELECT and FROM clauses, but ignore the table names if the column expressions match Criteria #3: Ignore the functions on the columns (column expressions) and the tables. Look at just the column names Criteria #4: Match a pair of queries, if a majority (e.g., >80%) of their SELECT columns are the same The above list of possible similarity criteria can easily balloon into the hundreds, if not more, if the database architect would also like to consider other artifacts in the SQL language, such as subqueries, FILTERs, JOINs, GROUP BY expressions, etc. Accordingly, there is a need for an approach for efficiently matching queries on different combinations of similarity criteria. Introduced here, therefore, are techniques that utilize, among others, bitwise summaries of queries to enable fast, interactive comparisons of tens of millions of SQL queries.

In some embodiments, a distributed computing methodology can be employed for identifying similar database queries. Because the computation is distributed, it is highly efficient in identifying groupings of similar database queries across a large number of database queries. For example, a small cluster of servers can take a very short time (e.g., a few minutes) to identify groupings of similar database queries on a workload of tens of millions of queries.

In some embodiments, more than two database queries can be similar. In such embodiments, the disclosed technique can identify groupings of similar database queries. Because the disclosed system is not constrained in handling a specific number of queries, there is no bound on the number of database queries from which groupings of similar queries can be extracted.

In some embodiments, the disclosed technique is completely interactive. That is, if the user changes the user-supplied similarity criteria from a previously-supplied similarity criteria, a new set of groupings of similar queries are generated in real time or near real time. The system imposes no limit on the number of database queries from which groupings of similar queries can be extracted.

Representing SQL Queries as a Set of Binary Vectors

A SQL query can include multiple artifacts that are of interest. As an example, a pair of SQL queries (Query A and Query B) is considered:

Query A:
   SELECT orders.orderId,
   customers.customerfirstname,
   customers.customerlastname,
   customers.customerzipcode,
   orders.orderdate
   FROM orders
   INNER JOIN customers
      ON orders.customerid=customer.customerid;

Query B:
   SELECT orders.orderId,
   customers.customerlastname,
   customers.customerzipcode,
   orders.orderdate
   FROM orders
   INNER JOIN customers
      ON orders.customerid=customer.customerid;

In this example, there are 4 SQL artifacts. The 4 SQL artifacts are:

Artifact 1:
   SELECT orders.orderId,
   customers.customerfirstname,
   customers.customerlastname,
   customers.customerzipcode,
   orders.orderdate Artifact 2:
   FROM orders
   INNER JOIN customers
      ON orders.customerid=customer.customerid;

Artifact 3:
   SELECT orders.orderId,
   customers.customerlastname,
   customers.customerzipcode,
   orders.orderdate Artifact 4:
   FROM orders
   INNER JOIN customers
      ON orders.customerid=customer.customerid;

The SELECT part of the query is for selecting the data that the user wishes to consider in the query, with such data being stored in the form of columns of a table. The FROM keyword is followed by a list of one or more tables from which the data to be considered in the query is selected. Thus, in this example, the part of the query that states "orders.orderId," the "orderId" column is stored in the "orders" table. Similarly, in "customers.customerzipcode," the "customerzipcode" column is stored in the "customers" table.

The INNER JOIN keyword selects records that have matching values in both tables. Thus, INNER JOIN customers
   ON orders.customerid=customer.customerid;
indicates choosing from "customers" table and the "orders" table, the data that data have matching "customerid" values.

In some embodiments, each artifact can be represented as a binary vector. Let us suppose a database architect is interested in matching SQL queries based on the SELECT and JOIN columns. For example, each query can be represented by two binary vectors, a vector of length 5 representing SELECT columns, and a vector of length 2 representing JOIN columns as follows:

|  | Query A SELECT | Query B SELECT | Query A JOIN | Query B JOIN |
| --- | --- | --- | --- | --- |
| orders.orderid | 1 | 1 | — | — |
| orders.orderdate | 1 | 1 | — | — |
| customers.customerfirstname | 1 | 0 | — | — |
| customers.customerlastname | 1 | 1 | — | — |
| customers.customerzipcode | 1 | 1 | — | — |
| orders.customerid | — | — | 1 | 1 |
| customers.customerid | — | — | 1 | 1 |

The length of each vector is determined by the cardinality of the universal set of all possible elements for that artifact. For example, the length of the SELECT vectors in this example is 5 because there are 5 columns in the universal set of all possible SELECT columns. This approach can easily extend to other SQL artifacts, such as columns in a GROUP BY or FILTER clause, column expressions, subqueries, etc.

From the above binary representation, it can be appreciated that the JOIN vectors of Query A and Query B are identical (i.e., 100% similar in every bit position). Also, the SELECT vector of Query A and Query B are pretty similar (i.e., similar in all positions except one bit position). Thus, the above example demonstrates that data access patterns such as columns associated with two queries can be similar.

The example above is illustrative and involves simple SQL queries. However, in practical scenarios, SQL queries can be long and complex, e.g., having thousands of keywords, and can involve millions of tables to handle. For such scenarios, a pen-and-paper manner of identifying data access patterns is humanly impossible. Thus, embodiments disclosed herein are directed at using computational techniques for identifying similarities in data access patterns regardless of the length or complexities of SQL queries.

FIG. 1 is an illustration of is an illustration of identifying similar SQL queries. A SQL query (e.g., included in a collection of SQL queries) can be represented as a set (collectively denoted 102) of binary vectors, with each binary vector representing a SQL artifact. Using the minhash technique 104, the binary vector is converted into multiple minhash vectors such as minhash signature vector 106a, minhash signature vector 106b, . . . minhash signature vctor 106n. Generally, a minhash signature vector is a hashed representation of a SQL query. The minhash technique is based on a Jaccard similarity measure.

An LSH algorithm variant 116 is then applied on each of minhash signature vector 106a, minhash signature vector 106b, . . . minhash signature vector 106n. It will be understood that due to space restrictions, a generic minhash signature vector 106i is shown as being subject to LSH variant 116. However, in implementations of the present technology, all (or some) minhash signature vectors are subject to LSH variant 116.

In some embodiments, the LSH variant includes the following steps. The minhash signature vector 106i is divided into b bands of r rows each. A hash function is applied to each band. For example, a hash function 110a is applied to the first band, a hash function 110b is applied to the second band, a hash function 110c is applied to the third band, and so on. Each hash function takes a set of r integers (i.e., the length of the band) as input and hashes it into a very large number of buckets, such as bucket 114a, bucket 114b, bucket 114c, and so on. Thus, a bucket array 112 (including bucket 114a, bucket 114b, bucket 114c, etc.) is created. In some embodiments, hash functions 110a, 110b, 110c, . . . are identical. For example, 110a, 110b, 110c, . . . can be a MD 5 hashing algorithm. In some embodiments, hash functions 110a, 110b, . . . 110c can be different hash functions. The number of hash functions can be equal to the number of bands ("b").

In some embodiments, hash function 110a, hash function 110b, hash function 110c, . . . hash function 110n can be applied in stages. Accordingly, in some scenarios, it is possible that two minhash signature vectors may not hash to the same bucket after the first band is hashed. But, as more and more bands of minhash signature vectors continue to be hashed, collisions between dissimilar hashed signature vectors are likely to occur in a hash bucket, and the "rogue" hashed signature vector gets moved around to other hash buckets. Thus, it will be appreciated that the combination of the Min Hash technique and the LSH variant, as discussed in FIG. 1, is similar to applying two hashing operations on the SQL queries.

Figure 2:
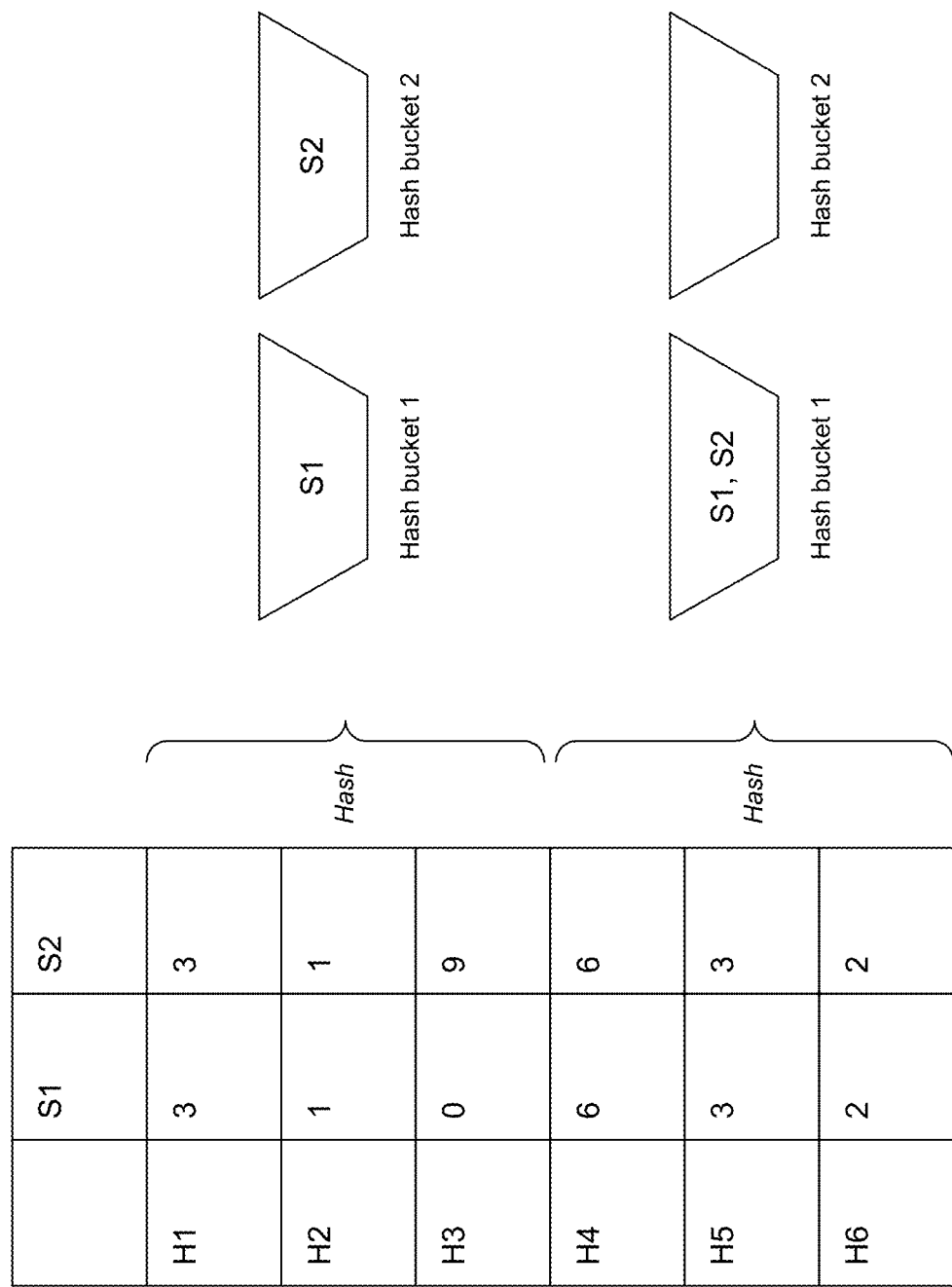
FIG. 2 shows details of a hashing operation in connection with identifying similar SQL queries, according to one embodiment of the present disclosure.

FIG. 2 is an illustration of reorganization of the contents of hash buckets. In FIGS. 2, S1 and S2 are example minhash signature vectors of a particular artifact from two SQL queries. H1-H6 are examples of 6 unique hash functions. Regions 120A and 120B of S1 and S2 are similar. Also, regions 122A and 122B of S1 and S2 are similar.

In FIG. 2, each of S1 and S2 include six rows. These 6 rows can be divided into two bands of three rows each. Thus, if "b" denotes the number of bands and "r" denotes the number of rows, b=2 and r=3. The first band of S1 can be represented as the tuple (3, 1, 0) and the first band of S2 can be represented as the tuple (3, 1, 9). The second band of both S1 and S2 can be represented as (6, 3, 2), i.e., the second bands of S1 and S2 are identical in this example.

A first hash function is applied to the first band of S1 and the first band of S2. At the end of the first hashing, S1 is hashed to hash bucket 1 and S2 is hashed into hash bucket 2. Next, a second hash function is applied to the second band of S1 and the second band of S2. At the end of the second hashing, both S1 and S2 hash into hash bucket 1, i.e., the hash buckets are reorganized with S2 moving from hash bucket 2 into hash bucket 1, because rows included in regions 120A, 120B and 122A, 122B respectively are similar. Thus, in this example, SQL vectors corresponding to the minhash signature vectors S1 and S2 will be considered as candidate pairs for similarity. This makes sense intuitively because one or more similar rows of a band are likely to end in the same bucket. Thus, for example, hash functions 114a, 114b, 114c, . . . can include different bands of the same query. Hash buckets 114a, 114b, 114c, . . . include the hashes of the bands of the same or different signature vectors. For example, hash bucket 114a can include bands (e.g., hashed portions) of queries 1, 3, 4, 6, 9, 11, and 13. Hash bucket 114b can include bands (e.g., hashed portions) of queries 1, 2, 3, 4, 7, 9. Thus, different hashed portions of the same query can be assigned to different hash buckets. In some embodiments, there is a mapping between a band (e.g., a hashed portion) and a query where it came from. This allows to identify all the queries (or, portions thereof) that are associated with a given hash bucket. Two SQL queries that are hashed/assigned to the same bucket are called "candidate pairs."

In some embodiments, the size of the band (denoted "b") and the size of the row (denoted "r") can be selected to achieve a certain level of error in computing the similarity metric of two SQL queries. That is, the values of b and r can be selected so that only two queries above a certain similarity threshold (denoted "t") will hash to the same bucket. In some implementations, a good approximation is t equal to or approximately equal to $(1/b)^{1/r}$. Thus, for example, if candidate pairs of queries above an 80% similarity threshold are desired, then in one implementation, r=16 and b=25. With these values of t, b, and r, the probability of either a false positive or a false negative can be calculated as 0.03%, assuming the probability of a false positive to be equal to the probability of a false negative. The formal mathematical proof of this is beyond the scope of this document, but it should be evident that the disclosed technique can, with a high degree of accuracy, efficiently compute candidate pairs given a similarity threshold, and drastically reduce the search space for finding similar SQL queries. Thus, the disclosed MinHash technique provides a benefit in reducing the search space for finding similar SQL queries.

In traditional systems, a pairwise comparison of SQL queries is done for all queries hashed to the same bucket. A partial distance matrix is generated, with all unknown pair-distances simply marked as infinity ("∞"). Then, clustering algorithms are applied on the distance matrix. However, generating the distance matrix for tens of millions of queries is slow, even if most pairwise comparisons have been eliminated and as a result, generating the distance matrix becomes very expensive computationally. To illustrate this point, the following table is provided:

| Number of SQL Queries | Number of Pairwise Comparisons |
| --- | --- |
| 3,000 | 4.5 million |
| 10,000 | 50 million |
| 100,000 | 5 billion |
| 10,000,000 | $5 * 10^{13}$ |

Thus, in order to handle massive number of pairwise comparisons, it may be necessary to determine groupings of SQL queries within a more manageable time.

In view of the above-mentioned challenges faced by conventional systems, according to disclosed implementations herein, groupings of similar SQL queries are created using the Locally Sensitive Hashing (LSH) family of algorithms. The LSH is meant to be "locally sensitive" because data points (e.g., SQL queries) that are located close (e.g., similar) to each other are mapped to similar hashes (i.e., included in the same bucket with high probability). Two SQL queries that are hashed to the same bucket are called "candidate pairs." In implementing the LSH, both false positives and false negatives are possible. False positives occur when two dissimilar SQL queries hash to the same bucket. False negatives occur when two similar SQL queries do not hash to the same bucket. By selecting how the hashing is done, the likelihood of both false positives and false negatives can be reduced. According to embodiments disclosed herein, a LSH variant is used in some implementations of the present disclosure.

Similarity candidate groups (formed as a result of applying the LSH on minhash signature vectors) can be used in determining the groupings of similar SQL queries, based on applying the LSH multiple times, for different SQL artifacts and different similarity thresholds. Each time the LSH is run, the LSH can generate a different output. All the LSH outputs can be accumulated to identify groupings of similar SQL queries. In other words, the LSH is run for all possible combinations of artifacts and thresholds. Groupings of similar SQL queries can be identified based on the outputs of the different LSH runs. The disclosed implementation works well regardless of the number of queries. That is, the performance of the disclosed implementation is not constrained by the number of queries and works equally well whether there are 100 queries or 10,000,000 queries.

In the disclosed implementation, the LSH is applied m*n times, where m is the number of SQL artifacts, and n is the number of degrees of similarity of interest to a database architect. For example, a database architect can be interested in matching queries based on their SELECT and JOIN columns with similarity thresholds of 70%, 80% and 90% associated with each of the SELECT and JOIN artifacts. Thus, there will be 3 degrees of similarity (e.g., corresponding to similarity thresholds of 70%, 80% and 90%) and 2 artifacts (SELECT and JOIN) of interest (i.e., m=2, n=3). Accordingly, 6 LSH runs can be performed, as follows:
 1. 70% similarity threshold on SELECT columns
 2. 70% similarity threshold on JOIN columns
 3. 80% similarity threshold on SELECT columns
 4. 80% similarity threshold on JOIN columns
 5. 90% similarity threshold on SELECT columns
 6. 90% similarity threshold on JOIN columns In this way, 6 LSH outputs are generated. In some implementations, the 6 outputs can be represented as a similarity-characterizing data structure, for example, as a collection of matrices stored in memory or on a disk.

In some implementations, it may be desired that the computation of these clusters be fast so that is possible for the database architect to experiment with different SQL artifacts and different thresholds in real-time or near real-time, with little or no delay. Thus, in some implementations, the processing associated with the m*n runs of the LSH are performed in parallel. However, a potential issue is that as the number of SQL artifacts of interest increase, the computational load increases as well. This can be mitigated by taking advantage of the fact that two SQL queries cannot be grouped into the same grouping if one query has an artifact that the other doesn't.

Figure 3:
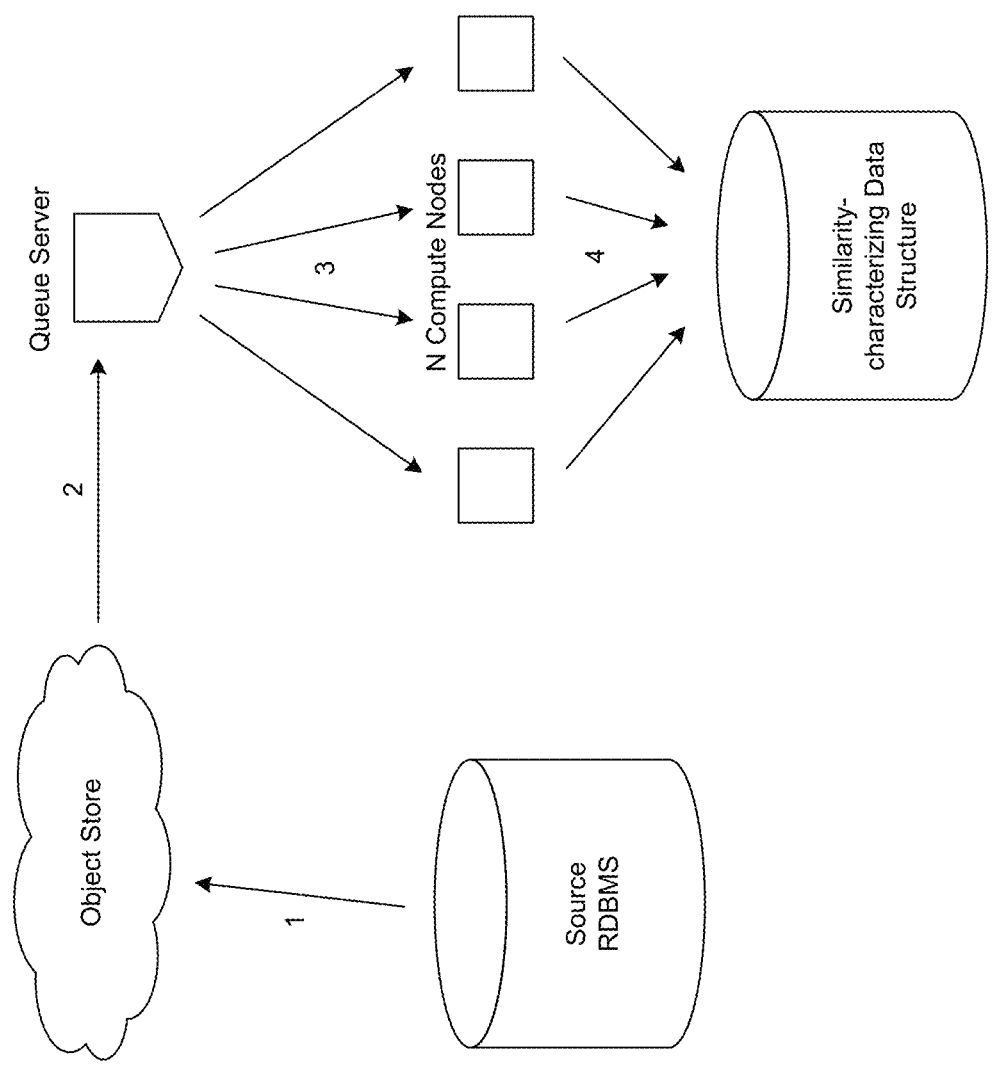
FIG. 3 is an illustration of a distributed computing operation for identifying similar SQL queries, according to one embodiment of the present disclosure.

FIG. 3 is an illustration of a distributed computing operation for identifying similar SQL queries, according to one embodiment of the present disclosure. Example steps 1-4 in connection with the distributed computing operation are shown in FIG. 2. At step 1, SQL queries are extracted from RDBMS logs. In some embodiments, SQL logs are uploaded to an object store. At step 2, a queue server extracts queries from the object store. At step 3, the queue server distributes the queries to compute nodes in the compute node cluster. In some embodiments, additional compute nodes can be added to speed up the processing of larger SQL workloads. At step 4, each compute node parses the query and extracts artifacts of interest from the SQL logs. In some embodiments, the text included in a query can be discarded after artifact extraction. Each compute node identifies a set of possible thresholds based on decomposing the range from zero to 100 into discrete steps. Each compute node also identifies a set of artifacts included in the plurality of database queries. Each compute node also determines a Boolean similarity measure between each pair of database queries, wherein a similarity measure of one indicates two similar database queries and a similarity measure of zero indicates two dissimilar database queries. The Boolean similarity measure is computed for each artifact included in the set of artifacts and each possible threshold included in the set of possible thresholds. By aggregating Boolean similarity measures for the set of artifacts and the set of possible thresholds, a similarity-characterizing data structure (e.g., a collection of Binary symmetric matrices), wherein the similarity-characterizing data structure is an aggregation of Boolean similarity measures for the set of artifacts and the set of possible thresholds.

Figure 4:
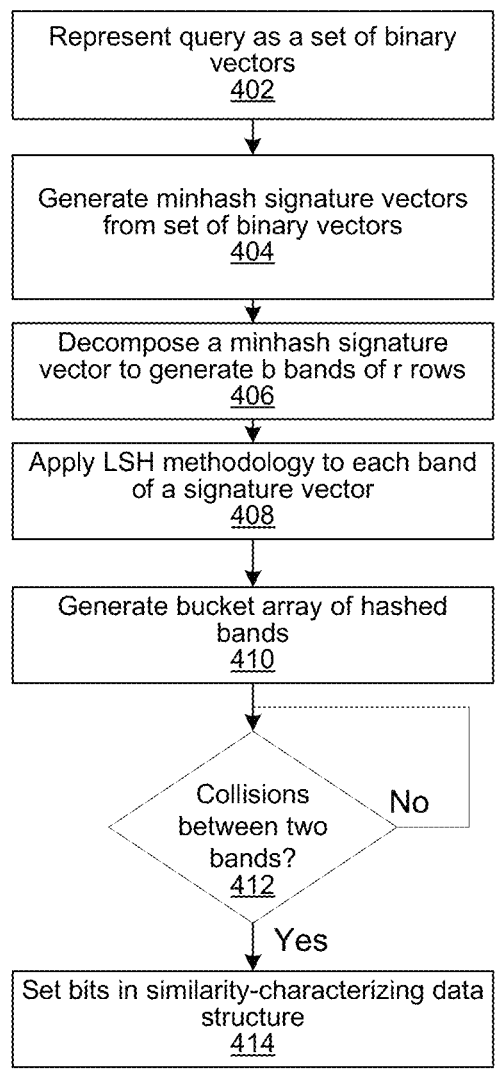
FIG. 4 is an example flow diagram showing steps in connection with creating a similarity-characterizing data structure, according to one embodiment of the present disclosure.

FIG. 4 is an example flow diagram showing steps in connection with identifying similar SQL queries, according to one embodiment of the present disclosure. At step 402, a SQL query is represented as a set of binary vectors. At step 404, minhash signature vectors corresponding the set of binary vectors is generated, e.g., by applying a MinHash technique on the set of binary vectors. At step 406, a minhash signature vector is decomposed to generate b bands of r rows. The values of b and r can be calculated by setting t equal to or approximately equal to $(1/b)^{1/r}$, where t denotes a threshold. For example, t can be assigned values of 10%, 20%, 30%, 40%, 50%, 60%, 70%, 80%, 90%, and 100%, by breaking up the range from 0 to 100% into discrete steps of 10%. At step 408, a LSH methodology is applied to each band of a minhash signature vector. At step 410, an array of buckets that include hashed bands of signature vectors is generated. Hashed signature vectors can be generated by applying a hashing methodology to a signature vector. In some embodiments, different hashed bands of the same signature vector can be hashed into different buckets. Upon determining (step 412) a collision between two hashed bands in a bucket, bits in a similarity-characterizing data structure are set (step 414). A collision between two hashed bands occurs when the two hashed bands are included in the same bucket. A similarity-characterizing data structure is a collection of Binary symmetric matrices.

FIGS. 5A and 5B are examples of database queries in connection with sale of an item in various markets, according to one embodiment of the present disclosure. Query 1, Query 2, Query3, and Query4 allow joining four tables: store_sales, customer_demographics, date_dim, item. All 4 queries group on item.i_item_id (i.e., an individual item), and are related to how an item fared across various sale-related metrics for a particular demographic. The differences between the queries are reflected in their respective SELECT clauses. The respective SELECT clauses include the various sale-related metrics and FILTERS a demographic slice and associated items. The functionality of the SELECT clause and FILTER clauses are further explained below:

Functionality of Query 1:

SELECT: For each item, finding the average net paid, quantity, list price, coupon amount, sales price, and net profit.

FILTER: Interested in items worth more than $50, that were purchased in 2017 by married men with a 4-year degree and a credit rating>600.

Functionality of Query 2:

SELECT: For each item, finding the average net paid, quantity, list price, coupon amount, sales price, and net profit.

FILTER: Interested in items in the 'Men', 'Sports', or 'Music' category that were purchased in 2017 by divorced men.

Functionality of Query 3:

SELECT: For each item, finding the average quantity, coupon amount, and sales price.

FILTER: Interested in items in the 'Jewelry', 'Women', or 'Shoes' category that were purchased in 2015 by married women Functionality of Query 4:

SELECT: For each item, finding the average quantity, list price, coupon amount, and sales price.

FILTER: Interested in items purchased in 2016 by unmarried women with an advanced degree and a credit rating>700.

FIG. 6A is an example of a first input set and a second input set, according to one embodiment of the present disclosure. The first input set and the second input set are sets of similarity criteria provided by a user. In this example, it is assumed that the database includes 4 queries as indicated in FIGS. 5A and 5B. Furthermore, it is assumed that the user is interested in identifying groupings of similar SQL queries based on the first input set and the second input set. It is further assumed that the user initially provides the first input set. Accordingly, the system displays a first result set showing a grouping of similar SQL queries included in the 4 queries (shown in FIGS. 5A and 5B). It is further assumed that the user initially provides the first input set that includes an initial set of similarity criteria. Subsequently, the user decides to update the first set to a second set that corresponds to an updated set of similarity criteria. As will be appreciated, the system generates in real time or near real time, a second result set including an updated grouping of SQL queries.

Figures 6B-1, 6B-2:
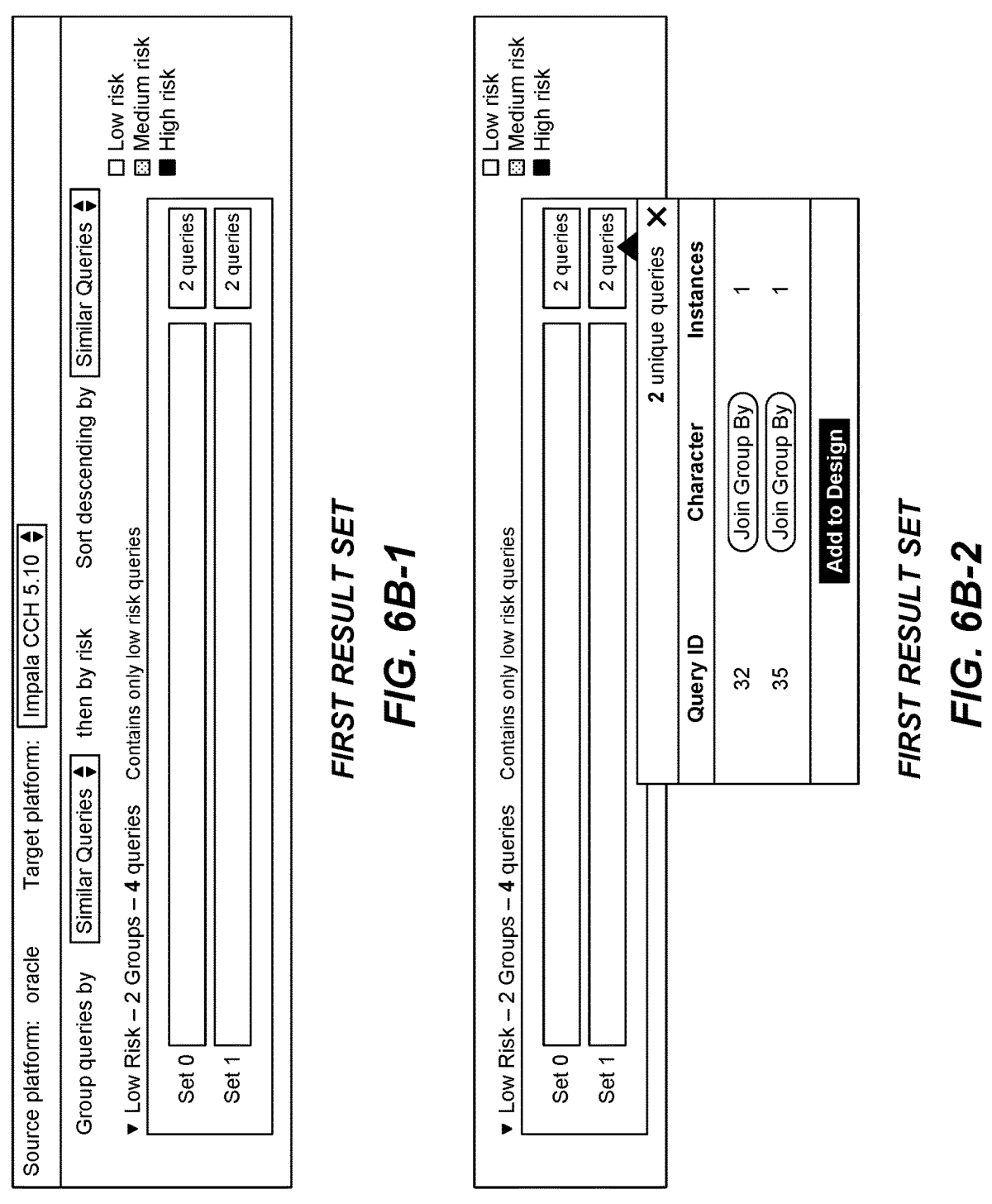

FIG. 6B is an example of a first result set showing a grouping of similar SQL queries, according to one embodiment of the present disclosure. In some embodiments, the system generates identifiers for queries. For example, in FIGS. 6A and 6B, Query 1, Query 2, Query 3, and Query 4 have identifiers 1, 18, 32, and 35 respectively. FIG. 6B shows two groupings, indicated as Set 0 and Set 1. Set 0 includes Query 1 and Query 2. Set 1 includes Query 3 and Query 4. These groupings are generated for the similarity criteria provided by a user and indicated in the first input set in FIG. 6A.

Figures 1, 6C:
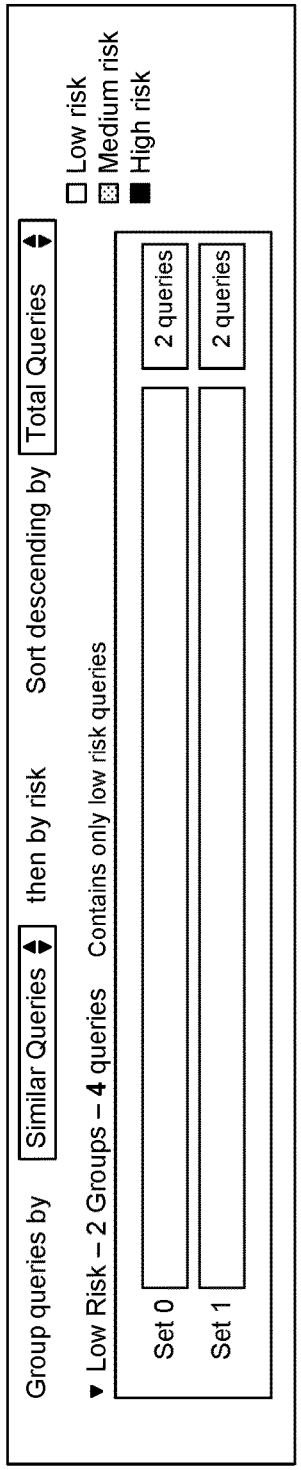
Figures 2, 6C:
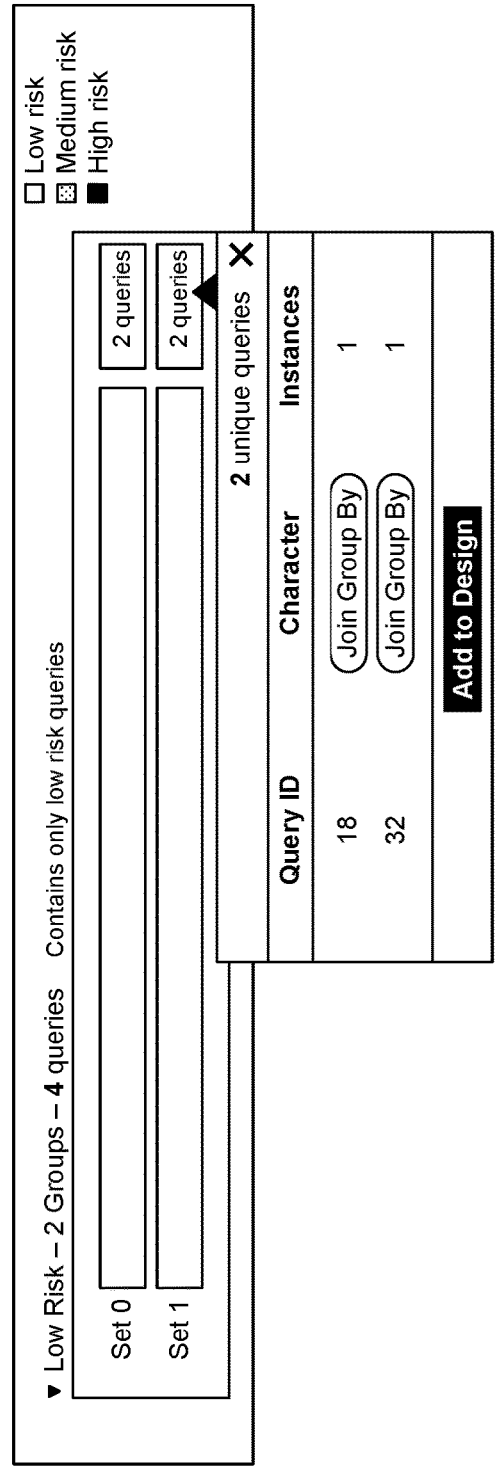

FIG. 6C is an example of a second result set showing a grouping of similar SQL queries, according to one embodiment of the present disclosure. The groupings S0 and S1 are generated for the similarity criteria provided by a user and indicated in the second input set in FIG. 6A. It will be appreciated that the second result set is generated with little or no delay in response to the user updating the first input set to the second input set. FIG. 6A shows two groupings, indicated as Set 0 and Set 1. Set 0 includes Query 1 and Query 4. Set 1 includes Query 2 and Query 3. These groupings are generated for the similarity criteria provided by a user and indicated in the second input set in FIG. 6A.

FIG. 6D shows examples of similarity matrices, according to one embodiment of the present disclosure. FIG. 6D shows a similarity matrix for the SELECT artifact and a similarity matrix for the FILTER artifact. The fractions correspond to a percentage similarity between two queries on the artifact. In the first input set, the user is interested in queries that have the same GROUP BY, ORDER BY and JOIN, ignore the WHERE artifact, and have 80% similarity on the SELECT artifact. All four queries have identical JOINs, GROUP BY, and ORDER BY. Query 1 and Query 2 have identical SELECT clauses (looking at columns), so they appear in a grouping. Query 3 and Query 4 share 4 out of 5 columns in their SELECT artifact so they meet the 80% clustering threshold.

In the second input set, the user is interested in queries that have the same GROUP BY, ORDER BY, and JOIN, ignore the SELECT artifact, and 80% similarity on the WHERE artifact. Query 1 and Query 4 share 5 out of 6 filter columns, meeting the 80% threshold. Query 2 and Query 3 are in the same grouping because they have identical filter columns. Notice that though the filter literals are different, the columns are the same.

Figure 7:
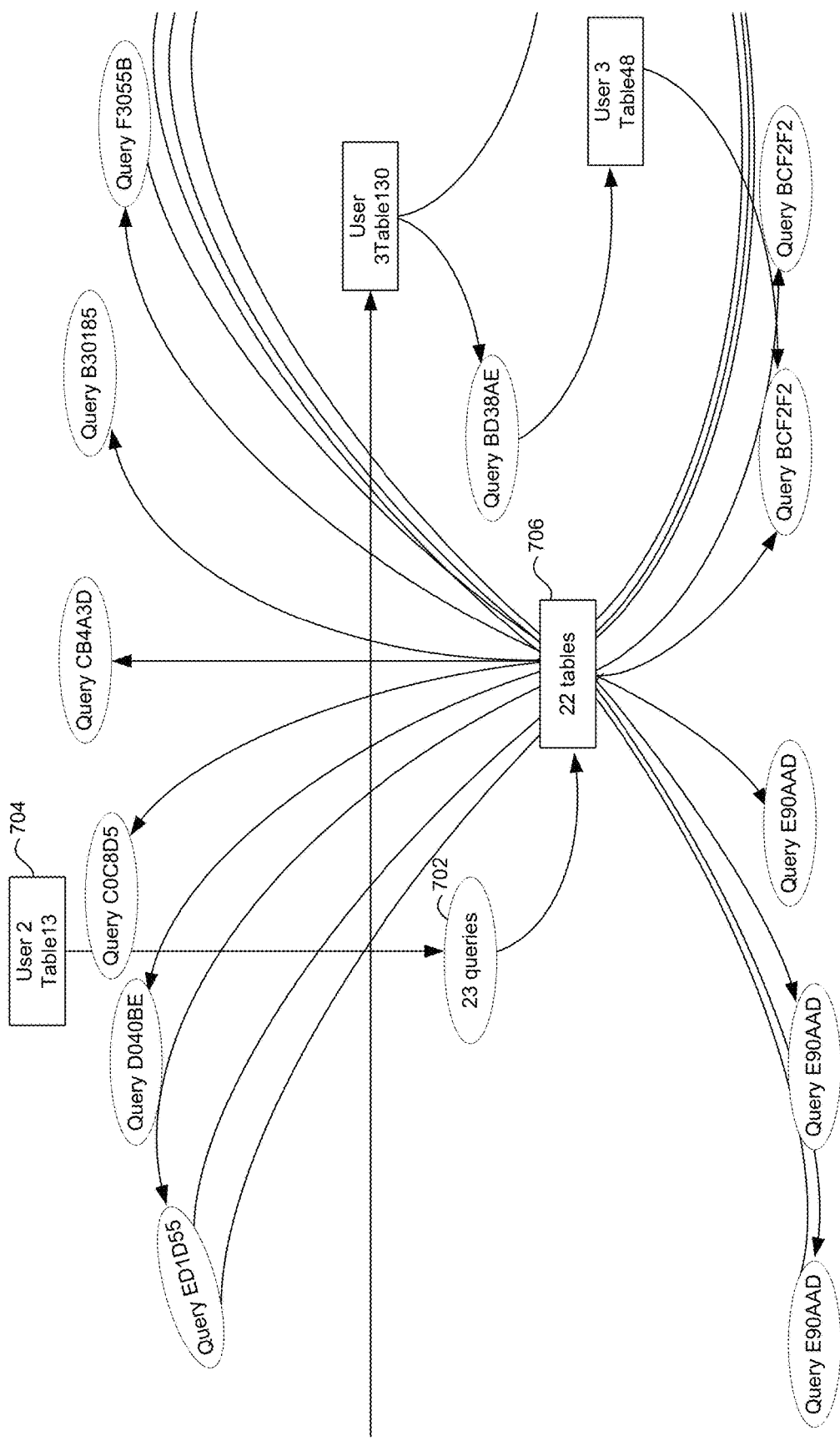
FIG. 7 is an example screenshot of a lineage diagram, according to one embodiment of the present disclosure.

FIG. 7 is an example screenshot of a lineage diagram, according to one embodiment of the present disclosure. A lineage diagram tracks tables and artifacts/columns as they transform as a result of execution of queries. For example a database query might take all three columns of a Table A and select two of those columns to be inserted into a Table B. More complicated transformations involving filters (where certain rows are put into Table B but not others) and aggregations (similar to summing the row values in a column). Many other types of transformations are possible as will occur to one skilled in the art.

Because many data transformations occur in the day to day operations of a database, these lineage diagrams can become very complicated, involving transformation sequences with hundreds of steps. By collapsing similar queries (as well as the tables created by these queries) into query groups, the diagram can be grown easily. By extracting common sequences of transformations, advanced database optimizations such as aggregate materialization can be recommended. The manner in which the lineage graph can be collapsed is defined by a database architect as it suits his or her particular business application. The lineage diagrams are generated after a database selects the manner according to which the queries would collapse. Parts of a query that are different from other queries or portions of a query in the same query group are typically shown highlighted. In the example lineage diagram shown in FIG. 7, the circles represent database queries and the rectangles represent tables. The diagram shows a bolder-outlined circle (denoted with reference numeral 702) named "23 queries." FIG. 7 illustrates that the data transformation corresponds to 23 queries taking data from a user table called user2.table13 (denoted with reference numeral 704) and inserting this data into 22 tables (denoted with reference numeral 706). These 23 queries have been identified to be a grouping of similar database queries using the disclosed techniques. Each of these transformations is deemed to be very similar, so the database architect can just focus on groups of queries in the diagram rather than having to look at each individual query. The database architect can access the queries by clicking on the circle. This greatly accelerates hand optimizations because it is immediately evident what are the most common transformation sequences, and focus on those for optimization.

Figure 8A:
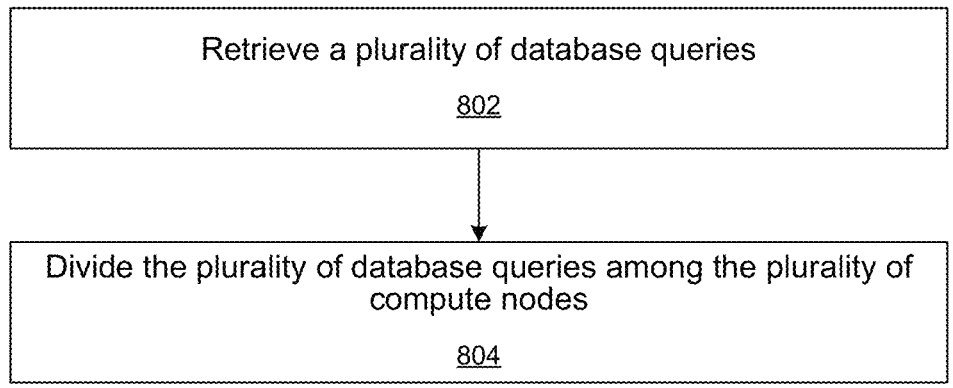
FIGS. 8A-8C are example flow diagrams showing steps for calculating new SQL groups, according to one embodiment of the present disclosure.
Figure 8B:
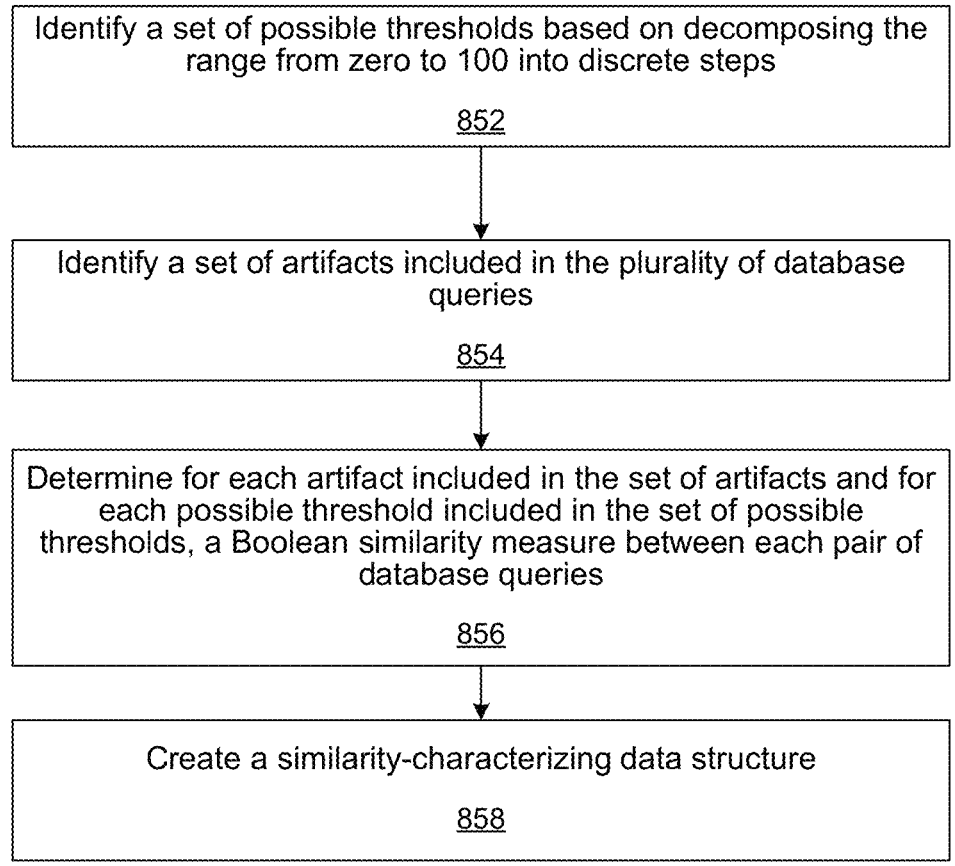
Figure 8C:
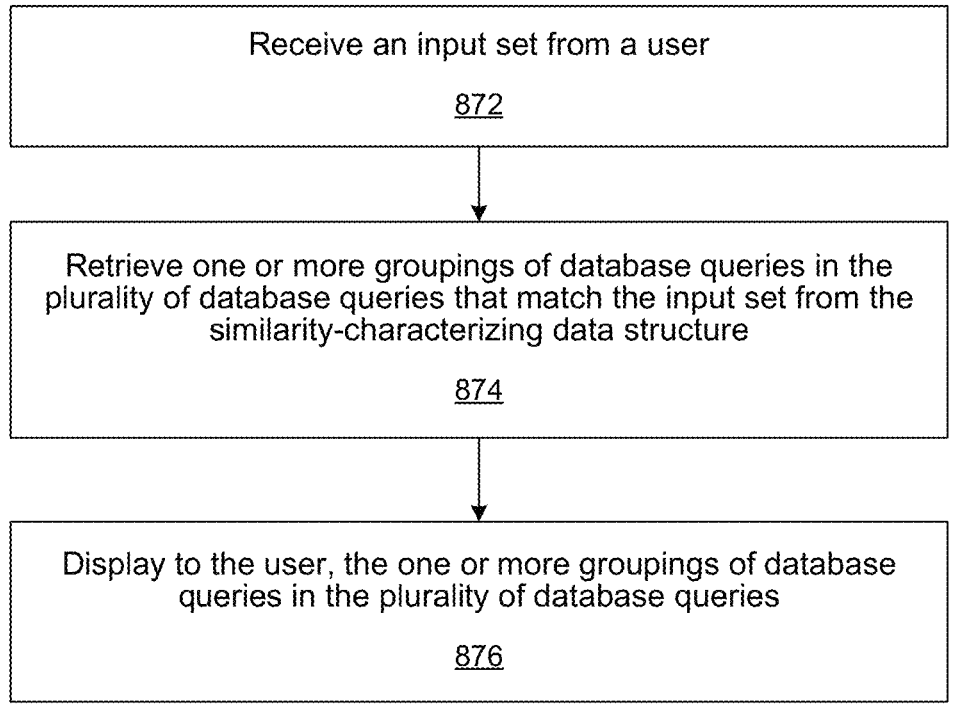

FIGS. 8A-8C are example flow diagrams showing steps associated with a distributed computing methodology in connection with calculating groupings of similar SQL queries. For example, FIG. 8A depicts steps performed by a queue server. FIG. 8B depicts steps performed by a compute node in a plurality of compute nodes. FIG. 8C depicts steps performed by a web server. Referring to FIG. 8A, at step 802, the queue server retrieves a plurality of database queries, the database queries including one or more artifacts. At step 804, the database server divides the plurality of database queries among a plurality of compute nodes.

Referring to FIG. 8B, at step 852, a compute node identifies a set of possible thresholds based on decomposing the range from zero to 100% (e.g., the entire range of thresholds possible) into discrete steps. For example, the set of possible thresholds can be 0%, 10%, 20%, 30%, 40%, 50%, 60% 70%, 80%, 90%, and 100%, when the discrete step is a fixed step of 10%. In some implementations, the set of possible thresholds do not form a sequence of fixed length. For example, the set of possible thresholds can be 0%, 30%, 40%, 50%, 80%, 90%, and 100%. At step 854, a compute node identifies a set of artifacts included in the plurality of database queries. For example, a database query can include the SELECT and WHERE artifacts. Another database query can include SELECT artifact only. At step 856, a compute node determines a Boolean similarity measure (i.e., a 0 or 1) between each pair of database queries, for each artifact included in the set of artifacts and each possible threshold included in the set of possible thresholds. Thus, for example, if the set of possible thresholds are 0%, 10%, 20%, 30%, 40%, 50%, 60% 70%, 80%, 90%, and 100%, and the set of artifacts are SELECT, JOIN, and WHERE; then the compute node determines a Boolean similarity measure for each artifact for the following combinations indicated in shaded cells below:

|  | SELECT | JOIN | WHERE |
|---|---|---|---|
| 0% | | | |
| 10% | | | |
| 20% | | | |
| 30% | | | |
| 40% | | | |
| 50% | | | |
| 60% | | | |
| 70% | | | |
| 80% | | | |
| 90% | | | |
| 100% | | | |

In some embodiments, determining the Boolean similarity measure between each pair of database queries includes creating a collection of signature vectors for each database query included in the plurality of database queries, wherein each signature vector in the collection of signature vectors represents an artifact included in the database query. (See, e.g., creation of signature vectors using the MinHash methodology in FIG. 1.) In some embodiments, a SimHash methodology can be used for creation of signature vectors. In some embodiments, the compute node applies an LSH methodology (e.g., see FIG. 1) to each signature vector in the collection of signature vectors, for each possible threshold included in the set of possible thresholds. The LSH methodology assigns each signature vector into one or more hash buckets, each hash bucket in the one or more hash buckets includes signature vectors that achieves the possible threshold in the set of possible thresholds. The one or more hash buckets indicate colliding database queries that are included in the one or more hash buckets. As an example, for the SELECT artifact and a possible threshold of 60%, one hash bucket can include signature vectors that are 60% or more similar with regards to the contents of the SELECT artifact/column. Two or more signature vectors (or, equivalently database queries) that are assigned into the same hash bucket are deemed to be "colliding" with one another. Upon determining the colliding database queries included in the one or more hash buckets, setting Boolean similarity measures in a similarity-characterizing data structure corresponding to the colliding database queries. For example, if the similarity-characterizing data structure is denoted as M, and if M(1, 4) is set, then database queries with identifier (id) 1 and id 4 are deemed similar, for an artifact-threshold combination. Also, because M is symmetric, M (4,1) is also set. In some embodiments, a similarity-characterizing data structure is created (step 858) based on aggregating the Boolean similarity measures for the set of artifacts and the set of possible thresholds. A similarity-characterizing data structure can be a collection of symmetric binary matrices with each position in the similarity-characterizing data structure representing a Boolean similarity measure for an artifact included in the set of artifacts and a possible threshold in the set of possible thresholds. Thus, for each artifact-threshold combination, a symmetric binary matrix is generated, the size of the symmetric binary matrix being N×N, wherein N the number of database queries compared for similarity/dissimilarity.

Referring to FIG. 8C, a web server receives an input set from a user, the input set including at least one artifact and one or more similarity thresholds associated with the at least one artifact. For example, the user can provide an input set associated with identifying similar database queries that are 80% similar with respect to the contents of the SELECT artifact and 70% similar with respect to the contents of the JOIN artifact. Embodiments of the present technology allow the user to supply an input set with any number or types of artifacts of interest to the user and the associated thresholds, as part of the input set. At step 874, the web server retrieves (from the similarity-characterizing data structure) one or more groupings of database queries in the plurality of database queries that match the input set. It will be recalled that the similarity-characterizing data structure indicates similarity between pair-wise database queries for a threshold and an artifact. In some embodiments, there are as many such matrices as the number of threshold-artifact combinations. At step 876, the one or more groupings of database queries in the plurality of database queries that match the input set are displayed to the user.

Although the discussions above refer to a distributed computing methodology of calculating groupings of similar SQL queries, embodiments of the present disclosure are not necessarily limited to distributed computing methodologies. For example, in some embodiments, one or more functionalities of the queue server, the web server, and/or the compute node can be combined together into one server or any number of servers.

Figure 9:
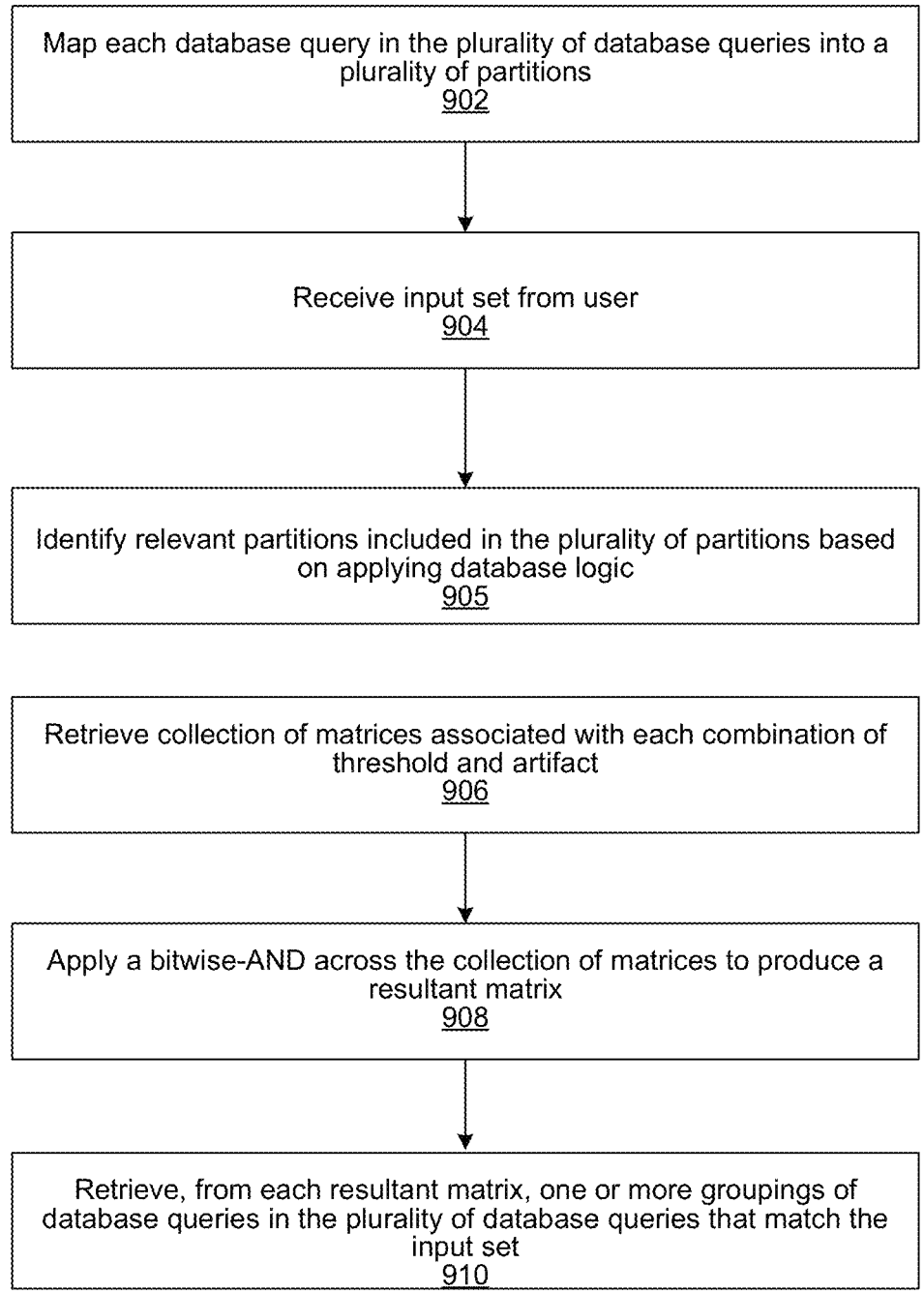
FIG. 9 shows an exemplary computer system architecture for performing one or more of the methodologies discussed herein.

FIG. 9 is an example flow diagram showing steps for calculating groupings of similar SQL queries, based on a partitioning methodology, according to one embodiment of the present disclosure. The disclosed partitioning methodology can be implemented as an optional optimization feature to generate faster groupings of SQL queries. It will be appreciated that the benefit of partitioning is to reduce the number of bits to set when setting bits in the similarity characterizing data structure following a hash collision in step 414. The number of bits to set is reduced because there are less queries in each bucket as a result of the partitioning, and setting each pairwise bit is an exponential operation (which means having half the number of queries in each bucket actually means having to set only a quarter of the bits). Partitioning drastically reduces the time needed to calculate the similarity-characterizing data structure, and is especially helpful in situations where similarity is to be calculated across many different artifacts.

At step 902, the system maps each database query in the plurality of database queries into a plurality of partitions, wherein each partition includes database queries that share at least one common artifact, wherein the similarity-characterizing data structure is created for each partition. In some embodiments, the similarity-characterizing data structure for each partition is a collection of symmetric binary matrices with each position in the similarity-characterizing data structure representing a Boolean similarity measure for an artifact included in the set of artifacts and a possible threshold in the set of possible thresholds. At step 904, the system receives an input set from the user. The input set includes at least one artifact and one or more similarity thresholds associated with the at least one artifact. The one or more similarity thresholds associated with the at least one artifact can quantify a degree or a percentage similarity between two database queries. For example, a user may be interested in identifying database queries that include the SELECT clause with a 70% similarity threshold, i.e., the user is interested in identifying queries in which contents of at least 70% of the SELECT columns are the same. Upon receiving the input set from the user, at step 905, the system identifies relevant partitions included in the plurality of partitions based on applying database logic. Partitions are relevant if the queries in the partition include at least all the artifacts in the input set. For each relevant partition and for each artifact and threshold combination in the input set, the system retrieves (at step 906) a similarity-characterizing data structure for each partition. A similarity-characterizing data structure for each partition is a collection of symmetric binary matrices with each position in the similarity-characterizing data structure representing a Boolean similarity measure for an artifact included in the set of artifacts and a possible threshold in the set of possible thresholds. Each partition includes database queries that share at least one common artifact, and a similarity-characterizing data structure is created for each partition. A similarity measure of one indicates two similar database queries (i.e., based on the threshold) and a similarity measure of zero indicates two dissimilar database queries. In some embodiments, a set of possible thresholds is identified by decomposing the range from zero to 100 into discrete steps. For example, the set of possible thresholds can be 0%, 10%, 20%, 30%, 40%, 50%, 60% 70%, 80%, 90%, and 100%. In some implementations, the set of possible thresholds do not form a sequence of fixed length. For example, the set of possible thresholds can be 0%, 30%, 40%, 50%, 80%, 90%, and 100%. At step 908, the system applies a bitwise-AND across the collection of matrices to produce a resultant matrix, wherein adjacent set bits in the resultant matrix represent one or more groupings of database queries that are similar. At step 910, the system retrieves (from each resultant matrix) one or more groupings of database queries in the plurality of database queries that match the input set. In some embodiments, adjacent set bits in the resultant matrix can be detected based on a Breadth First Search (BFS) methodology. Because in-memory bitwise operations are very quick, the user experience is interactive, and the one or more groupings of database queries are computed near-instantaneously. In some embodiments, further performance gains are possible by optimizing for the sparsity of the symmetric binary matrices.

Example Computer System

Figure 10:
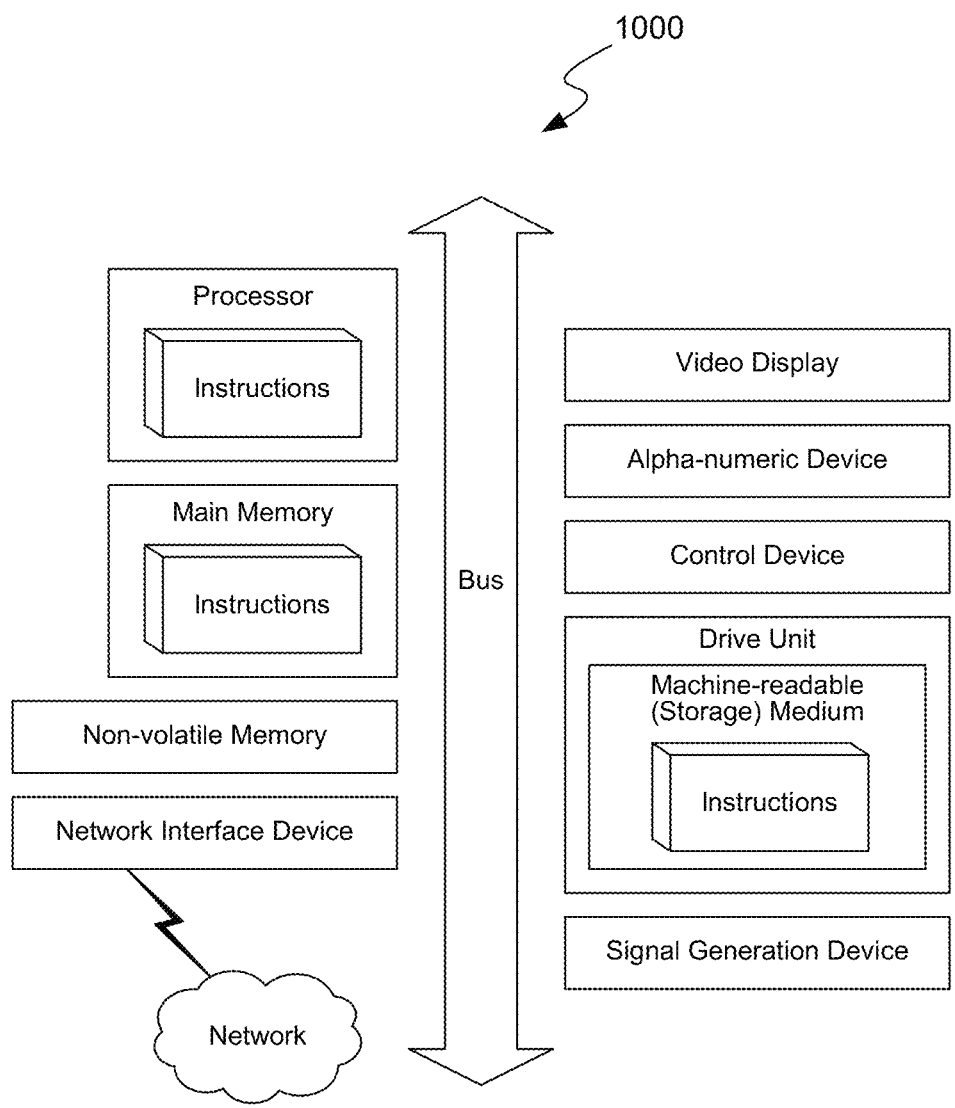
FIG. 10 depicts an exemplary computer system architecture to perform one or more of the methodologies discussed herein.

FIG. 10 depicts an exemplary computer system architecture to perform one or more of the methodologies discussed herein. In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components and features described herein can be implemented. The computer system 1000 can be of any applicable known or convenient type. The components of the computer system 1000 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and/or the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. From the foregoing, it will be appreciated that specific embodiments of the invention have been described herein for purposes of illustration, but that various modifications may be made without deviating from the scope of the invention.

What is claimed is:

1. A method for identifying similar database queries, the method comprising:
   receiving an input set from a user, wherein the input set indicates at least one artifact and one or more similarity thresholds associated with the at least one artifact;
   accessing a data structure associated with a plurality of database queries, wherein the data structure is a collection of symmetric binary matrices with each position in the data structure representing a Boolean similarity measure between a pair of database queries in the plurality of database queries;
   retrieving, from the data structure, one or more of the collection of symmetric binary matrices associated with each artifact and threshold combination in the input set;
   applying a logic operation across the one or more symmetric binary matrices to produce a resultant matrix, wherein adjacent set bits in the resultant matrix represent one or more groupings of database queries that are similar;
   retrieving, from the resultant matrix, one or more groupings of database queries in the plurality of database queries that match the input set; and
   concatenating a new database query with a result from a previous database query based on the one or more groupings of database queries.

2. The method of claim 1, wherein the input set is a first input set, the method further comprising:
   receiving a second input set from a user, wherein the second input set is different than the first input set; and
   replacing, using the data structure, the one or more groupings of database queries in the plurality of database queries that match the first input set with a second one or more groupings of database queries in the plurality of database queries that match the second input set.

3. The method of claim 2, wherein the one or more groupings of database queries are replaced with the second one or more groupings of database queries in real time or near real time in response to receiving the second input set from the user.

4. The method of claim 1, wherein the input set is a first input set, the method further comprising:
   receiving a second input set from a user, wherein the second input set is different than the first input set;
   retrieving, from the data structure, one or more of the collection of symmetric binary matrices associated with each artifact and threshold combination in the second input set;
   applying a logic operation across the one or more symmetric binary matrices associated with each artifact and threshold combination in the second input set to produce a second resultant matrix, wherein adjacent set bits in the second resultant matrix represent one or more groupings of database queries that are similar; and retrieving, from the second resultant matrix, a second one or more groupings of database queries in the plurality of database queries that match the second input set.

5. The method of claim 1, further comprising:
causing display of a result set showing the one or more groupings of database queries.

6. The method of claim 1, wherein the logic operation is a bitwise-AND operation.

7. The method of claim 1, wherein the data structure is one of a plurality of data structures, each of the plurality of data structures associated with a different one of a plurality of partitions, wherein each of the plurality of database queries is mapped to one of the plurality of partitions, wherein each partition of the plurality of partitions includes database queries that share at least one common artifact.

8. The method of claim 7, further comprising:
in response to receiving the input set, identifying a relevant partition from the plurality of partitions by applying database logic;
wherein the data structure is associated with the relevant portion.

9. The method of claim 1, wherein the at least one artifact is associated with any of a clause in a database query, a column expression in the database query, or a subquery in the database query.

10. The method of claim 1, further comprising:
generating the data structure by:
identifying a set of artifacts included in the plurality of database queries;
identifying a set of possible thresholds based on decomposing a range from zero to 100 into discrete steps;
determining, for each artifact included in the set of artifacts and each possible threshold included in the set of possible thresholds, the Boolean similarity measure between each pair of database queries in the plurality of database queries, wherein a similarity measure of one indicates two similar database queries and a similarity measure of zero indicates two dissimilar database queries.

11. The method of claim 10, wherein determining the Boolean similarity measure between each pair of database queries includes:
creating a collection of signature vectors for a particular database query included in the plurality of database queries, wherein each signature vector in the collection of signature vectors represents an artifact included in the particular database query;
for each possible threshold included in the set of possible thresholds, applying a LSH methodology to each signature vector in the collection of signature vectors, wherein the LSH methodology assigns each signature vector into one or more hash buckets, wherein each hash bucket in the one or more hash buckets includes signature vectors that achieves the possible threshold in the set of possible thresholds, wherein the one or more hash buckets indicate colliding database queries that are included in the one or more hash buckets; and
upon determining the colliding database queries included in the one or more hash buckets, setting Boolean similarity measures in the data structure corresponding to the colliding database queries.

12. The method of claim 1, further comprising:
generating the data structure by:
dividing the plurality of database queries among a plurality of compute nodes; and
causing a particular compute node of the plurality of compute nodes to:
identify a set of artifacts included in a subset of the plurality of database queries that are assigned to the particular compute node;
identify a set of possible thresholds based on decomposing a range from zero to 100 into discrete steps; and
determine, for each artifact included in the set of artifacts and each possible threshold included in the set of possible thresholds, the Boolean similarity measure between each pair of database queries in the subset of the plurality of database queries, wherein a similarity measure of one indicates two similar database queries and a similarity measure of zero indicates two dissimilar database queries.

13. A system for identifying similar database queries, the system comprising:
one or more processors; and
a memory coupled to the one or more processors, the memory having instructions stored thereon which, when executed by the one or more processors, cause the system to perform operations including:
receiving an input set from a user, wherein the input set indicates at least one artifact and one or more similarity thresholds associated with the at least one artifact;
accessing a data structure associated with a plurality of database queries, wherein the data structure is a collection of symmetric binary matrices with each position in the data structure representing a Boolean similarity measure between a pair of database queries in the plurality of database queries;
retrieving, from the data structure, one or more of the collection of symmetric binary matrices associated with each artifact and threshold combination in the input set;
applying a logic operation across the one or more symmetric binary matrices to produce a resultant matrix, wherein adjacent set bits in the resultant matrix represent one or more groupings of database queries that are similar;
retrieving, from the resultant matrix, one or more groupings of database queries in the plurality of database queries that match the input set; and
concatenating a new database query with a result from a previous database query based on the one or more groupings of database queries.

14. The system of claim 13, wherein the input set is a first input set, the memory having further instructions stored thereon which, when executed by the one or more processors, cause the system to perform operations further including:
receiving a second input set from a user, wherein the second input set is different than the first input set; and
in real time or near real time in response to receiving the second input set from the user:
replacing, using the data structure, the one or more groupings of database queries in the plurality of database queries that match the first input set with a second one or more groupings of database queries in the plurality of database queries that match the second input set.

15. The system of claim 13, wherein the data structure is one of a plurality of data structures, each of the plurality of data structures associated with a different one of a plurality of partitions, wherein each of the plurality of database queries is mapped to one of the plurality of partitions, wherein each partition of the plurality of partitions includes database queries that share at least one common artifact.

16. The system of claim 13, wherein the at least one artifact is associated with any of a clause in a database query, a column expression in the database query, or a subquery in the database query.

17. A non-transient computer-readable medium storing instructions, execution of which in a computer system causes the computer system to perform operations comprising:
   receiving an input set from a user, wherein the input set indicates at least one artifact and one or more similarity thresholds associated with the at least one artifact;
   accessing a data structure associated with a plurality of database queries, wherein the data structure is a collection of symmetric binary matrices with each position in the data structure representing a Boolean similarity measure between a pair of database queries in the plurality of database queries;
   retrieving, from the data structure, one or more of the collection of symmetric binary matrices associated with each artifact and threshold combination in the input set;
   applying a logic operation across the one or more symmetric binary matrices to produce a resultant matrix, wherein adjacent set bits in the resultant matrix represent one or more groupings of database queries that are similar;
   retrieving, from the resultant matrix, one or more groupings of database queries in the plurality of database queries that match the input set; and
   concatenating a new database query with a result from a previous database query based on the one or more groupings of database queries.

18. The non-transient computer-readable medium of claim 17, wherein the input set is a first input set, storing further instructions execution of which in the computer system causes the computer system to perform operations further comprising:
   receiving a second input set from a user, wherein the second input set is different than the first input set; and
   in real time or near real time in response to receiving the second input set from the user:
      replacing, using the data structure, the one or more groupings of database queries in the plurality of database queries that match the first input set with a second one or more groupings of database queries in the plurality of database queries that match the second input set.

19. The non-transient computer-readable medium of claim 17, wherein the data structure is one of a plurality of data structures, each of the plurality of data structures associated with a different one of a plurality of partitions, wherein each of the plurality of database queries is mapped to one of the plurality of partitions, wherein each partition of the plurality of partitions includes database queries that share at least one common artifact.

20. The non-transient computer-readable medium of claim 17, wherein the at least one artifact is associated with any of a clause in a database query, a column expression in the database query, or a subquery in the database query.

* * * * *